July 7, 1964    J. B. FEDER ETAL    3,140,243
TWO STAGE DISTILLATION OF HIGH PURITY PHENOL
Filed June 10, 1960
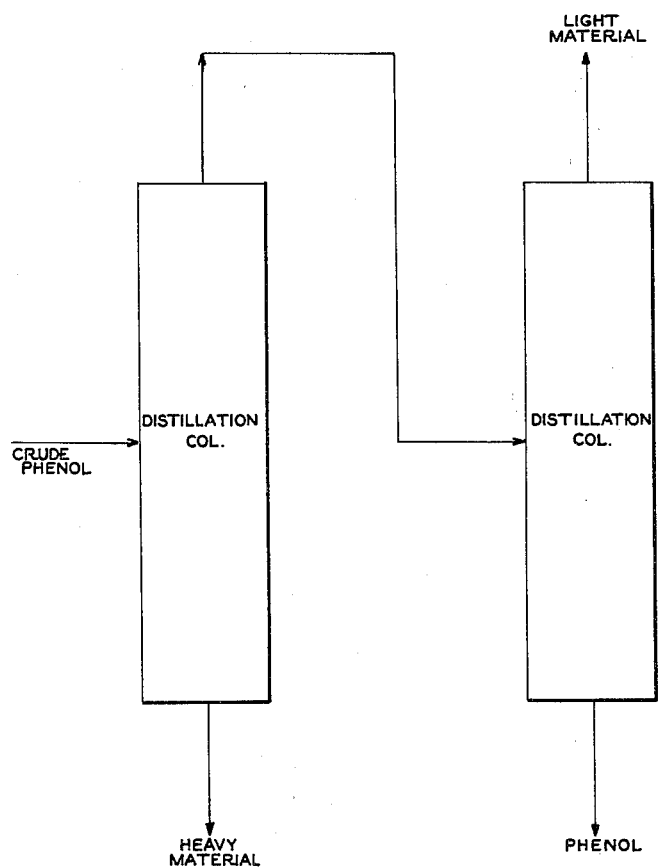
INVENTORS
JACK B. FEDER
JOSEPH L. RUSSELL
BY *William C. Long*
ATTORNEY

United States Patent Office 3,140,243
Patented July 7, 1964

3,140,243
TWO STAGE DISTILLATION OF HIGH PURITY PHENOL
Jack B. Feder, Yonkers, N.Y., and Joseph L. Russell, Ridgewood, N.J., assignors to Halcon International, Inc., a corporation of Delaware
Filed June 10, 1960, Ser. No. 35,127
3 Claims. (Cl. 202—40)

This application relates to a process for the purification of phenol, more particularly to the purification of phenols obtained by the dehydrogenation of an oxygenated cyclohexane derivative such as cyclohexanol, cyclohexanone, or mixtures thereof and especially to a fractionation process conducted in at least two basic steps, the higher boiling materials being separated from the phenol in one step, and the lower boiling materials being separated therefrom in another step to give high purity phenol.

Phenol, a very important industrial chemical, may be prepared by the dehydrogenation of cyclohexanol or cyclohexanone. However, it has been found by tests that high grade phenol cannot be obtained from the resulting dehydrogenation products by the ordinary fractionation process. The art is confronted by the problems of providing economical and convenient methods for obtaining high grade phenol from a crude phenol material obtained by the dehydrogenation of cyclohexanone, cyclohexanol, or mixtures thereof.

The discoveries associated with the invention relating to solutions of the above problems and the objects achieved in accordance with the invention as described herein include the provision of:

The process for preparing a pure phenol from a crude phenol containing at least one oxygenated cyclohexane derivative as an impurity, which process comprises fractionating said crude phenol into at least two fractions, fraction (a) containing substantially all of the phenol and fraction (b) containing the higher boiling constituents of the crude phenol, and fractionating fraction (a) and recovering pure phenol as a higher boiling fraction thereof;

Such processes wherein the crude phenol contains not over 10% of the oxygenated cyclohexane derivative impurity;

Such processes wherein the crude phenol is obtained by dehydrogenating a cyclohexanone-cyclohexanol cut of a cyclohexane oxygenation product;

And other objects which will be apparent as details or embodiments of the invention are set forth hereinafter.

The process of this invention may be readily understood by reference to the appended drawing which is a diagramamtic illustration of apparatus and process flow suitable for the practice of the invention.

In order to indicate still more fully the nature of the present invention, the following examples of typical procedures are set forth, in which parts and percent mean part and percent by weight, respectively, it being understood that these examples are presented as illustrative only and are not intended to limit the scope of the invention.

Example 1

The apparatus used in this example is a one-inch diameter, vacuum-jacketed, 35 actual plate glass column (Oldershaw) equipped with a time switch operated magnetic reflux splitter and further equipped with a column entry point onto Plate No. 7 up from the pot which side entry point is equipped with a stop-cock and a glass U-tube acting as a liquid seal.

The distillation pot is charged with crude phenol, obtained from cyclohexane; e.g., by subjecting cyclohexane to an air oxidation at 150° C. and super atmospheric pressure in the presence of a cobalt naphthenate catalyst so as to give a reaction mixture in which about 8% of the cyclohexane is oxidized. This reaction mixture is vacuum distilled and a cut boiling just above (above) cyclohexane and through (including) cyclohexanol is obtained as a charge stock for dehydrogenation. Dehydrogenation is accomplished using a platinum-on-carbon catalyst to produce the crude phenol used in the distillation.

The distillation pot is charged with the crude phenol. Low boilers, water, and phenol are removed as distillate using a reflux ratio of 5 to 1, atmospheric pressure, and a head temperature which varies between 60° C. and 184° C. Distillation pot temperature is 180° C. intially, and up to a final temperature of 280° C.

Analysis of portions of this distillate indicates small amounts of cyclohexanol in only the early portions distilled overhead and no cyclohexanone in either the early or later portions of the distillate. The distillate or first fraction is not pure phenol. The residue or second fraction contains the higher boiling materials and may contain some phenol. This residue may be recycled to the dehydrogenation step if desired, or an oxygenated cyclohexane fraction thereof may be separated and only this fraction recycled to the dehydrogenation step.

The first fraction is re-fractionated using equipment as already described at an initial reflux ratio of 2 to 1 for removal of water and light ends, at head temperatures between 60° C. and 178° C. Then the reflux ratio is changed to 20 to 1 and distillation is continued to a final pot temperature of 205° C. (the pot temperature during most of this distillation is between 182° and 185° C.). The head temperature after removal of light ends and water is between 178° and 182° C. After removal of light ends and water, samples taken from Plate No. 7 up from the bottom and from the distillate receiver have the following freezing points:

| Approx. percent of first fraction distilled (inclusive) | Head Temp. in ° C. | Sample Point | Freezing Point in ° C. |
|---|---|---|---|
| 54 | 178 | Plate No. 7 | 40.6 |
| 54 | 178 | Receiver | 40.3 |
| 57 | 179 | Plate No. 7 | 40.6 |
| 61 | 179 | Receiver | 40.2 |

It is evident from these results that pure phenol (of 40.6° C. freezing point) is obtained by this two-stage process.

Example 2

The procedure of Example 1 is repeated except that the impure phenol is derived by dehydrogenation of an equal mixture of commercial grades of cyclohexanol and cyclohexanone.

The crude phenol analyses about 95.9% phenol, and it is fractionated using equipment as already described. The reflux ratio is 10 to 1 initially and it is charged to 20 to 1 when the head temperature is 172° C. The first fraction thereof contains 93% of the phenol in the charge, along with light ends and water.

The water and light ends are removed during refractionation (of the first fraction) at temperatures between 69° and 182° C. The distillation receiver is drained and sampled periodically. Plate No. 7 up from the bottom is also sampled periodically.

The following table summarizes operating conditions at the stage of these samplings and freezing points of the samples of phenol:

| Percent of first fraction distilled (inclusive) | Head Temp. in ° C. | Sample Point | Freezing Point in ° C. |
| --- | --- | --- | --- |
| 9.1 | 179 | Plate No. 7 | 40.7 |
| 14.7 | 182 | Receiver | 32.2 |
| 23.9 | 182 | Plate No. 7 | 40.75 |
| 27.2 | 183 | Receiver | 38.5 |
| 32.9 | 183 | Plate No. 7 | 40.85 |
| 36.7 | 183 | Receiver | 40.1 |
| 42.5 | 184 | do | 40.4 |
| 47.4 | 184 | Plate No. 7 | 40.85 |
| 52.7 | 184 | Receiver | 40.7 |
| 78.5 | 183 | do | 40.65 |
| | | Pot Residue [1] | 40.80 |

[1] 15.6% of first fraction charged.

In this refractionation step, 71.4% of the first fraction is recovered as pure phenol (freezing point of at least 40.6° C.) and about 25% thereof is separated as a lower boiling fraction. Pure phenol may be recovered as distillate, drained from Plate No. 7, or drained from the pot. The overall recovery of phenol of freezing point of at least 40.6° C. from the crude phenol is about 69.2% for this example.

It is indeed surprising that high purity phenol may be recovered in such a convenient manner if the higher boiling materials are first removed therefrom. In the presence of such higher boiling materials only impure phenol (freezing point less than 40.6° C.) can be obtained.

The foregoing distillations are run at atmospheric pressure and this is preferred. However, if desired, higher or lower pressures may be used by making temperature adjustments.

If desired, the first fraction may be removed in different cuts, such as a sub-fraction containing lower boiling material and another sub-fraction containing phenol. Pure phenol is obtained from the latter.

The crude phenol generally should contain a preponderance of phenol together with a minor proportion of the oxygenated cyclohexane impurity, such as cyclohexanone or cyclohexanol or mixtures thereof. Of course, if any impurities present tend to form an azeotropic composition with phenol (which composition is of the type which is higher boiling than phenol), the amount of such impurities should be less than the amount required to combine all of the phenol in such a composition. In the case where the impurity is cyclohexanone, the amount thereof should be less than about 25% of the mixture. It is desirable that if any such impurities are present, the amount thereof be not over about 10% of the crude phenol mixture, and preferably not over about 2% thereof.

The distillation may be carried out in any convenient fractionation equipment or apparatus, such, for example, as a bubble cap or tray column, a packed tower, and the like, and in a batch, semi-continuous, or continuous manner.

Corresponding substituted phenols such as cresols and resorcinols containing corresponding impurities may be purified by corresponding procedures.

The process of this invention is particularly adapted for obtaining high purity phenol from a crude product obtained by the process described in the application of Saffer and Lidov, Serial No. 24,855, entitled "Chemical Process," filed in the U.S. Patent Office on or about April 26, 1960.

In view of the foregoing disclosures, variations and modifications thereof will be apparent to one skilled in the art, and it is intended to include within the invention all such variations and modifications except as do not come within the scope of the appended claims.

What is claimed is:

1. A process for the production of phenol from crude phenol which contains not more than 10% by weight of an oxygenated cyclohexane impurity which comprises fractionally distilling the crude phenol and separating a first fraction containing phenol and material boiling lower than phenol from a second fraction boiling higher than phenol, fractionally distilling said first fraction in a second separate fractional distillation and separating pure phenol as higher boiling product from said second distillation, both fractional distillations being carried out at substantially atmospheric pressure in the absence of added agents.

2. A process of claim 1 wherein the crude phenol contains not over 2% of the oxygenated cyclohexane derivative impurity.

3. A process of claim 1 wherein the crude phenol is obtained by dehydrogenating a cyclohexanone-cyclohexanol cut of a cyclohexane oxygenation reaction product.

References Cited in the file of this patent

UNITED STATES PATENTS

| | | |
| --- | --- | --- |
| 2,115,401 | Shiffler et al. | Apr. 26, 1938 |
| 2,265,939 | Field | Dec. 9, 1941 |
| 2,486,342 | Taylor et al. | Oct. 25, 1949 |
| 2,679,535 | Lavender et al. | May 25, 1954 |
| 2,728,795 | Armstrong et al. | Dec. 27, 1955 |
| 2,762,760 | Walker | Sept. 11, 1956 |
| 2,824,048 | Huppe et al. | Feb. 18, 1958 |